United States Patent
Matyssek (10) Patent No.: US 12,257,627 B2
(45) Date of Patent: Mar. 25, 2025

(54) POWDER BED FUSION ADDITIVE MANUFACTURING WITH LOAD BALANCING FOR MULTIPLE BEAMS

(71) Applicant: Nikon SLM Solutions AG, Lübeck (DE)

(72) Inventor: Jan Lukas Matyssek, Lübeck (DE)

(73) Assignee: Nikon SLM Solutions AG, Lübeck (DE)

( * ) Notice: Subject to any disclaimer, the term of this patent is extended or adjusted under 35 U.S.C. 154(b) by 0 days.

(21) Appl. No.: 18/489,164

(22) Filed: Oct. 18, 2023

(65) Prior Publication Data

US 2024/0246150 A1    Jul. 25, 2024

Related U.S. Application Data

(63) Continuation of application No. PCT/EP2022/059930, filed on Apr. 13, 2022.

(30) Foreign Application Priority Data

Apr. 21, 2021 (DE) ...................... 10 2021 110 091.7

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B29C 64/153* (2017.08);
(Continued)

(58) Field of Classification Search
CPC ........ B22F 10/85; B22F 10/28; B29C 64/153; B29C 64/282; B29C 64/371; B29C 64/393; B33Y 50/02; B33Y 10/00; B33Y 30/00

(Continued)

(56) References Cited

U.S. PATENT DOCUMENTS

| 2008/0131540 A1 | 6/2008 | Perret et al. |
| 2016/0114432 A1* | 4/2016 | Ferrar ................. B23K 26/342 219/76.12 |

(Continued)

FOREIGN PATENT DOCUMENTS

| CN | 107635749 A | 1/2018 |
| CN | 112041766 A | 12/2020 |

(Continued)

OTHER PUBLICATIONS

PCT International Search Report and Written Opinion, PCT/EP2022/059930, Jul. 5, 2022, 10 pages.

*Primary Examiner* — Chun Cao
*Assistant Examiner* — Michael Tang
(74) *Attorney, Agent, or Firm* — Quarles & Brady LLP; Yakov S. Sidorin (57) ABSTRACT

A manufacturing process includes fusing an area of a material layer with beams from multiple sources, each of which has a predefined fuse rate and a field of view. Efficiency of fusing is increased by estimating optimum fusing times with the use of size of the area to and fuse rates involved, determining optimum size of the area to be fused, and determining those vectors of the area that could be irradiated and fused by a given of the multiple sources. As a result, the set of locations at the area is determined that can be fused by a given source almost exactly within the optimum fusing time. Vectors representing the area are then compared to products of optimum fusing times and corresponding fuse rates and, if a vector and a corresponding product are in a predetermined relationship, a subset of the vector is selected for irradiation by identified source.

21 Claims, 5 Drawing Sheets

(51) Int. Cl.
   *B29C 64/153* (2017.01)
   *B29C 64/282* (2017.01)
   *B29C 64/371* (2017.01)
   *B29C 64/393* (2017.01)
   *B33Y 50/02* (2015.01)
   *B33Y 10/00* (2015.01)
   *B33Y 30/00* (2015.01)
(52) U.S. Cl.
   CPC .......... *B29C 64/282* (2017.08); *B29C 64/371* (2017.08); *B29C 64/393* (2017.08); *B33Y 50/02* (2014.12); *B33Y 10/00* (2014.12); *B33Y 30/00* (2014.12)
(58) Field of Classification Search
   USPC .......................................................... 700/118
   See application file for complete search history.

(56) References Cited

U.S. PATENT DOCUMENTS

| | | | |
|---|---|---|---|
| 2017/0297813 | A1 | 10/2017 | Carroll et al. |
| 2018/0272611 | A1* | 9/2018 | Cantzler ................. B22F 10/28 |

FOREIGN PATENT DOCUMENTS

| | | |
|---|---|---|
| DE | 102013205724 A1 | 10/2014 |
| DE | 102018203233 A1 | 9/2019 |
| WO | 2016075026 A1 | 5/2016 |
| WO | 2016110440 A1 | 7/2016 |
| WO | 2018133799 A1 | 7/2018 |
| WO | 2020178216 A1 | 9/2020 |
| WO | 2022087043 A1 | 4/2022 |

* cited by examiner

POWDER BED FUSION ADDITIVE MANUFACTURING WITH LOAD BALANCING FOR MULTIPLE BEAMS

CROSS-REFERENCE TO RELATED APPLICATIONS

This US Patent Application is a continuation of the pending International Patent Application No. PCT/EP2022/059930 filed on Apr. 13, 2022 and now published as WO 2022/223411, which designates the United States and claims priority from the German Patent Application No. DE 10 2021 110 091.7 filed on 21 Apr. 2021. The disclosure of each of the above-identified patent documents is incorporated herein by reference.

BACKGROUND

1. Field of the Invention

The invention relates to a method and an apparatus for the powder bed fusion process and to a storage medium including instructions to execute the method.

2. Description of Related Art

There are a number of additive manufacturing techniques, as well referred to as 3D-printing processes. One of these techniques is the so-called powder bed fusion process. Very briefly summarizing, the powder bed fusion process consists of iteratively applying a powder layer onto a support structure and selectively adhering powder particles to another or previously adhered agglomerates by heating the respective particles using an electron beam, a laser beam or any other kind of radiation beam (hereinafter jointly "beam" for short). Adhering particles of a powder bed by scanning a surface of the powder bed with a beam is referred to as fusing, regardless of the physical or chemical process (melting, sintering, welding, radiation induced chemical reaction, . . . ) that provides the result of adhered particles. Vividly speaking, sectional views of the product to be manufactured are so to speak written on each newly applied top layer by moving a beam spot over the surface of the upmost powder layer. By adding a new powder layer after each writing step a so-called powder bed is formed. Embedded in the powder bed is the already manufactured portion of the workpiece. Depending on the final product, sometimes additional auxiliary structures have to be "written" into the powder layer, but herein we do not focus on this aspect and we consider these to be a part of the workpiece. Once all layers have been written, the workpiece, potentially with its adhering auxiliary structures, may be removed from the powder bed and may be subjected to further processing, if required. The terms product and workpiece are used interchangeably in this field and hence herein.

The powder bed fusion process is very capable, but it is desirable to reduce the manufacturing times for a given workpiece. To this end, it has been suggested to use multiple beams which independently write a portion of each layer (i.e. a portion of the "sectional view") of the workpiece onto each layer of the powder bed. Further, in particular in case the up-facing surface of the powder is increased to manufacture larger workpieces, multiple beams sourced can be distributed at different locations above the powder bed to reduce imperfections due to beam expansion and parallaxes. This approach, however, has limitations, for example fumes being produced by a first beam may interfere with another beam, which is detrimental to the quality of the product. Other problems are related to heat dissipation in the powder bed or to beam spot distortion. Beam spot distortion describes the effect of an increasing elliptic distortion of the beam spot formed on the powder bed as a function of increasing deviation of the angle of incidence from a near normal incidence.

WO 2016/075026 A suggests optimizing a multi beam laser powder bed fusion process by virtually separating the surface of a powder bed into a number of surfaces sections, wherein each beam illuminates and hence fuses powder particles in a single surface section being assigned to said beam. Once all beams finished writing on a layer, i.e. when the next powder layer can be applied to the powder bed, the run-times of each beam source, as well referred to as "beam-on times" of the different beam sources are compared and the boundaries between the surface sections are adjusted to compensate for differences in the run times. For example, if beam source No. 1 has a lower beam-on time than beam source No. 2, when writing the layer No. 1, the boundary between the surface sections being associated to beam sources No. 1 and No. 2 are shifted to increase the surface area of the surface section associated to beam source No. 1 and to decrease the surface section associated to beam source No. 2. Thereby, idle times of the beam sources are reduced when fusing the next layer, i.e. layer No. 1+1. Alternatively, the areas of the actually illuminated surfaces may be compared and based on the comparison the boundaries between the surface sections may be adjusted to compensate for differences in the actually illuminated surfaces.

WO 2020/178216 A suggests controlling the positions of the beam spots of a multi beam laser powder bed fusion process such that at—no point in time—any line connecting two beam spots is parallel to a flow direction of an inert gas flow over the powder bed.

DE 10 2013 205 724 A1 suggests improving the powder bed process by coordinating the direction in which the beam of a beam source scans a portion of the powder bed and the inert gas flow direction. This coordination can be obtained by limiting the angle of the scanning direction and the inert gas flow direction to the interval [22.5°, 337.5°], preferably to the interval [90° and 270° ].

DE 10 2018 203 233 A1 suggests scanning a sectional view of a workpiece in the powder bed process by at least two lasers. Each laser is assigned a region of the sectional view, i.e. the respectively assigned region is scanned by the corresponding laser. The boundary between of these two neighbored regions of the sectional view is saw tooth line, to thereby increase the strength of the manufactured workpiece.

WO 2016/110 440 A1 as well relates to a multiple beam powder bed process. Each beam has a field of view and at least two of these fields of view are overlapping. To improve scanning speed, it is suggested to locate the sectional view to be irradiated by the beams at least in part in a portion of the powder bed in which the fields of view of at least two beams are overlapping. The sectional view is scanned by the beams at the same time, wherein the distance between the spots being irradiated at the same time is reduced over time until the irradiated spots of the beams at least partially, preferably fully overlap. The beam intensities are reduced with an increase of the overlap to maintain the energy being provided to each spot of the sectional view being scanned constant.

SUMMARY OF THE INVENTION

The object of the invention is thus to further improve the multi beam powder bed fusion process with the object of reducing the cost for manufacturing a workpiece.

The invention is based on the observation that the prior art suggestions for defining the boundary between two adjacent surface sections of the surface of a top layer of a powder bed is based on the beam-on times measured when writing the previous layer. This process iteratively finds the optimum boundary position and hence leads to a significant cumulation of idle times. This approach is further increasingly inefficient, the more the surface areas to be illuminated in the different surface sections change from layer to layer.

The method for manufacturing a workpiece includes fusing an area A ("the area A", for short) of a surface of a layer of a fusible material ("the layer", for short). In practice, the layer may be the present upmost layer of a powder bed on top of a powder bed support of an additive manufacturing machine configured to use and/or to implement the powder bed fusion process. Once the area A of the of the top layer intended to be fused have been fused, the next layer may be applied to the powder bed, e.g. using a recoater. Initially, the upmost layer may be the first layer of the powder bed being subsequently deposited during the process.

As already apparent the term "area" does not denote the entire surface of the layer, but only a portion thereof that shall be fused. The symbol A thus represents a set of locations (points) that can be represented as vectors p, all in the plane defined by the surface of the layer, which shall be and during the process are irradiated by at least one beam spot being emitted by a beam source. The symbol |A| hence symbolizes a value indicative for the size of the surface of the area A, i.e. |A| is the surface area of the area A. Using the skilled person's language |A| is a norm, generally referred to as $\|A\|$, only for simplicity we omit herein the second set of vertical bars.

The area A may be the entire area EA of the layer to be irradiated, but in another example, the area A may be only a portion thereof, i.e. $A \subset EA$. For example, those parts of the entire area EA to be irradiated that define, e.g., a portion of the contour of the workpiece may be subtracted from the entire area to thereby obtain "the area A". The contour portions being subtracted may, for example, be irradiated always by the same beam source to increase the quality of the workpiece surface defined by said contour. Alternatively, or in addition, the 'entire area' EA may be divided in subareas, e.g. to improve fume management. As already stated "the area A" may be a subarea of the 'entire area EA'. Generalizing, one may thus say that the area A may be at least a portion of a sectional view of the workpiece to be manufactured by application of the laser powder bed fusion process, wherein the section plane corresponds to the position of the layer of fusible material to be irradiated.

The area A may include multiple subareas, we call sectors to distinguish the sectors verbally from the previously discussed 'subareas of the entire area to be irradiated'. The sectors may by spaced from each other, i.e. there may be a gap between neighboured sectors of the area A. Further, as already apparent, it is irrelevant for the invention to which layer the area A is associated. All that is required is that the area A can be irradiated by beams being emitted by the beam sources. When referencing to an area A on a particular layer, the symbol $A^l$ may be used. Thus $A^1$ would be an area on the first layer of a powder bed, $A^2$ an area of subsequent layer of the powder bed, $A^l$ is an area on the $l^{th}$-layer. If the up script is omitted this means that the position of the Area A in the sequence of layers is not relevant and may take any number.

The area A is typically determined by a so called "slicer" based on a CAD-model of the workpiece to be manufactured. But the invention is not limited to this example.

As already apparent from the wording fusing a surface area A of a layer of a fusible material, the method includes fusing the portion of the fusible material of the layer as defined by the surface area A. To this end at least two spots of at least two beams are projected by at least two beam sources onto the set of locations defining the surface area A. The method can be used in case there are only two beam sources, but practice the number may be higher. Typical values are, depending on the size of the layer, between 8 to 12, but the invention is not limited to this range. Future powder bed fusing apparatuses are expected to have even higher numbers of beam sources. Herein we symbolize the total number of beam sources being available by "n". This number "n" of beam sources being available may be different from the number of beam sources of the powder bed fusion apparatus. For example, if one or more beam sources has or have been assigned the task of fusing a contour portion which is not a portion of the area A, then these assigned beam source(s) cannot contribute to fusing the area A, while fusing the respective contour portion(s). Once the assigned contour portions have been fused, these beam sources can be used to fuse sections of the area and the number "n", hence can be increased. Another ground for a number "n" being smaller than the number of installed beam sources may be to reduce the thermal power that needs to be removed from the workpiece or simply because a section of the area would be so small that location management would be difficult. For example, if a section is very small, it can become almost impossible to avoid fusing the section while not operating in a smoke plume being produced by fusing the powder bed in another section. Thus, is short, the number "n" represents the number of lasers being assigned to jointly fuse an area A. As will become apparent below, the number may even change during the process of assigning locations of the area A to the sets of locations $L_i$ ($1 \le i \le n$) which may then be fused by the corresponding $i^{th}$-beam source. This may, e.g., happen if it turns out that the size of the area of a set of locations $L_i$ would be below a predefined threshold $T_i$.

Each of the n, (n≥2) beam sources has a predefined field of view $F_i$, wherein the index i indicates the corresponding $i^{th}$-beam source, e.g. $F_1$ is the field of view of the first beam source, $F_2$ is the field of view of the second beam source, or more generally $F_i$ is the field of view of the $i^{th}$-beam source. The field of view $F_i$ is the surface portion of the layer that can be irradiated by the corresponding $i^{th}$-beam being emitted by the $i^{th}$-beam source. In practice, each field of view $F_i$ may be defined by a scanner optic of the $i^{th}$-beam source. Constraints in the field of view $F_i$ may be imposed by pivot ranges of a scanner optic, limits of (optional) focussing optics and as well by a limit of the acceptable beam distortion. In general, the field of view $F_i$ can be understood as the portion of the layer that can be reasonably fused using the corresponding $i^{th}$-beam source. The field of view $F_i$ can thus be expressed as set of vectors $\vec{f}_i$ on the surface of the layer that can be irradiated and hence fused using the $i^{th}$-beam source. Thus, $|F_i|$ is the size of the portion of the surface of the layer that can be irradiated by the corresponding $i^{th}$-beam source. Further, each beam source i has a predefined fuse rate $R_i$ (a positive real number), wherein the fuse rate indicates the size of the surface field of view that can be fused by the $i^{th}$-beam source per unit of time. The fuse rate $R_i$ is a surface area per time and hence can be measured, e.g. in $$\frac{m^2}{s} \left[ \frac{meter^2}{second} \right]$$

or the like. For example, when fusing a surface, the beam spot often travels along a first vector, defining a first fuse trace until a stop condition is reached. Then the beam may be switched off and the beam source may be repositioned to a new start point. Next, the beam may be switched on again and the beam spot travel may travel, e.g. parallel to the previously fused fuse trace. Calculation of the fuse rate $R_i$ may thus account for the time being required to reposition the beam source. In practice the fuse rate $R_i$ can be considered as a mean fuse rate that may be determined iteratively with an increasing accuracy. The fuse rates $R_i$ may differ between different beam sources and may as well depend on a given material to be fused. At least for a given material, the fuse rates $R_i$ are preferably at least almost the same, meaning that $(1 \pm \beta_{R_i})R_i = R_j$, $\forall i \neq j, i, j < n$, wherein $\beta_{R_i} \in \{25/100, 20/100, 15/100, 10/100, 5/100, 25/1000, 1/100, 5/1000', 25/10000, 125/10000, 1/1000, 0\}$. In another example, the fuse rate $R_i$ is simply the length (times the width) of a trace the $i^{th}$-laser scans per unit of time without accounting for the time required to reposition laser beam optics when starting a new trace.

Fusing the area A may include irradiating different sets $L_i$ of locations $\vec{l}_i$ on the layer using the $i^{th}$-beam source for the corresponding set of locations $L_i$, wherein the intersection of different sets of locations may preferably be empty, i.e. preferably the relation $L_i \cap L_j = \{ \} = 0$, $\forall i \neq j$ holds. This means essentially, that each location $\vec{p}$ of the area A may be fused only by a single beam source. Generally, it is preferred to use all beam sources of the powder bed fusing apparatus for fusing the area, but this is not required and, in some cases, not even possible (as explained above). Of course, the different sets of locations $L_i$ may be irradiated at the same time. In practice the trajectories of the projections of the beam spots of different beams sources may overlap, e.g. similar to the overlapping of sections of a single beam's trajectory to ensure a given strength and surface quality in those regions of the layer, where the final workpiece shall not have a gap. There have been suggestions to fuse using overlapping sets of locations, but herein this is although not excluded—not intended. Intended is $|L_i \cap L_j| \leq \beta_L \cdot \text{Max}(\{|L_i|, |L_j|\})$, wherein $\beta_L \in \{25/100, 20/100, 15/100, 10/100, 5/100, 25/1000, 1/100, 5/1000, 25/10000, 125/10000, 1/1000, 0\}$, preferrably $\beta_L = 0$. Thus, generally, it may be intended to separate the area A into a number n sets of locations $L_i$, wherein n indicates the number of beam sources that shall be used. Preferably, n indicates the number of beam sources having a field of view with a non-vanishing overlap with the area A, i.e. the number of different indices for which $F_i \cap A \neq \{ \}$ in another example n indicates the number of beam sources having a field of view with an overlap with the area A being greater than a threshold T, i.e. only those beam sources are considered for which $|F_i \cap A| \geq T_i$.

Preferably, prior to fusing the area A, an optimum fusing time $t_o(i)$ may be determined (step 1.1). There are a number of possibilities to estimate an optimum fusing time $t_o(i)$, and in a preferred example the optimum fusing time can be determined by dividing the size of the area $|A|$ by the sum of the fuse rates $R_i$ of all involved beam sources, hence $$t_o(i) = \frac{|A|}{\sum_{j=1}^{n} R_j},$$

$\forall 1 \leq i \leq n$. In this case all beam sources would require the same amount of time to fuse their respective sets of locations $L_i$, i.e. idle times are minimized. Other estimations may be used as well. For example, one may use $$t_o(i) = \frac{(1 + \beta_{t,i})|A|}{\sum_{j=1}^{n} R_j} \text{ or } t_o(i) = \frac{(1 - \beta_{t,i})|A|}{\sum_{j=1}^{n} R_j},$$

wherein $\beta_{t,i} \in \{25/100, 20/100, 15/100, 10/100, 5/100, 25/1000, 1/100, 5/1000, 25/10000, 125/10000, 1/1000, 0\}$, preferrably $\beta_{t,i} = 0$. Generalizing, any suited measure for an optimum fusing time $t_o(i)$ can be chosen, preferably $t_o(i)$ may be selected to obey $$\frac{(1 - \beta_{t,i})|A|}{\sum_{j=1}^{n} R_j} \leq t_o(i) \leq \frac{(1 + \beta_{t,i})|A|}{\sum_{j=1}^{n} R_j}.$$

Thus, the optimum fusing time depends on the size of the surface area $|A|$ to be fused, following the convention that an upscript indicates the number of a layer the optimum fusing time may as well be indicated as $t_o(i)$. Unless required we will omit the upscript as well as the indication of the associated beam source "(i)" for simplicity.

Equivalent to determining the optimum fusing time $t_o(i)$, one may as well or in addition determined the optimum size of a corresponding fusing area $|L_i^{opt}|$. In a preferred example $|L_i^{opt}| = t_o(i) \cdot R_i$.

In addition, at least a first intersecting set $IS_1$ of the surface area A and the first field of view ($F_1$) of a first beam source may be determined, hence $IS_1 := A \cap F_1$. (step 1.2). This is equivalent to determining those vectors of the area A on the surface of the layer that generally could be irradiated and hence subjected to fusing by the $1^{st}$-beam source. Further intersecting sets $IS_i$ may be determined as well, wherein $IS_i$ is the intersecting set being associated to the $i^{th}$-beam source. In an example, $IS_i$ may generally be defined as $IS_i = A \cap F_i, \forall 1 \leq i \leq n$. But as will be apparent below, other definitions may be used as well. Further, it should be noted, that an intersecting set $IS_i$, $i \geq 2$ may preferably be determined after the set of locations $L_{i-1}$ has been determined as explained below. (Only for formal simplicity one may define $L_0 := \{ \}$ or more generally $L_j := \{ \} \forall j \leq 0, \forall j > n$.

In a further step, the size of at least the first intersecting set $|IS_1|$ is compared to the product of the optimum fusing time $t_o(i)$ with the fuse rate $R_i$ of the corresponding $i^{th}$-beam source (step 1.3) and if the relation $t_o(i) \cdot R_i < |IS_i|$ holds true, then a subtrahend surface $S_1$ with $S_1 \subset IS_1$ and at least one of $(1-\alpha_1) \cdot (|IS_1| - t_o(i) \cdot R_1) \leq |S_1| \leq (1+\alpha_1) \cdot (|IS_L| \cdot t_o(i) \cdot R_1)$ and its equivalent $(1-\alpha_i)(|IS_1| - |L_1^{opt}|) \leq |S_1| \leq (1+\alpha_1)(|IS_1| - |L_1^{opt}|)$ may be determined wherein the condition that for each $\vec{p}_1 \in S_1$, $\exists F_k | \vec{p}_1 \in F_k$, $k \in \{2, \ldots, n\}$ may be observed (step 1.3.1). $\alpha_1$ can be considered as an error margin (hence $\alpha_1 = 0$ is preferred) and is defined below in detail.

Again, by replacing the index 1 by the index i, the step may be generalized to obtain the $i^{th}$-subtrahend surface $S_i$ being associated to the $i^{th}$-beam source, i.e. generalizing in case the condition $t_o(i) \cdot R_i < |IS_i|$ holds true, the $i^{th}$-subtrahend surface $S_i$ may be determined using the conditions $S_i \subset IS_i$ and $(1-\alpha_i) \cdot (|IS_i| - t_o(i) \cdot R_i) \leq |S_i| \leq (1+\alpha_i)(|IS_i| - t_o(i) \cdot R_i)$ (and/or $(1-\alpha_i)(|IS_i| - |L_i^{opt}|) \leq S_i \leq (1+\alpha_i)(|IS_i| - |L_i^{opt}|))$ that for each $\vec{p}_i \in S_i, \exists F_k | \vec{p}_i \in F_k, k > i\}$ may be obeyed, wherein $\alpha_i \in \{0.25, 0.2, 0.15, 0.1, 0.05, 0.025, 0.01, 0.005, 0\}$. Smaller values of $\alpha_i$ are preferred, in a particular preferred example $\alpha_i = 0$. If $\alpha_i = 0$, then the constraint on $|S_i|$ simplifies to $|S_i| = |IS_i| - t_o(i) \cdot R_i$. These constraints on $S_i$ enable to determine any $L_i = IS_i - S_i$, and to thereby determine a set of locations $L_i$ which can be expected to be fused by the $i^{th}$-beam source almost exactly within the preselected optimum fusing time $t_o(i)$. Thus, if all sets of locations $\{L_i\}$ are, e.g., iteratively determined as explained above these are be selected such that the time for fusing the area may be minimized. This minimization is due to the fact the suggested determination of the sets of locations $\{L_i\}$ ensures, that within the error margins given by the $\beta_{t,i}$ and $\alpha_i$ it can be expected that all beam sources require the same amount of time to fuse their respective set of locations $L_i$. Idling of beam sources is minimized. It should be noted that it is not required to determine all $L_i$ as suggested. For example the $n^{th}$ set of locations $L_n$ can be determined using $L_n = A - \Sigma_{i=1}^{n-1} L_i$ because $A = \Sigma_{i=1}^n L_i$.

Herein, we assume that the steps are reiterated for every $i \leq n$, starting with the lowest value of $i = 1$ and then within each iteration the value is increased by one, i.e. prior to each repetition of step 1.1 or 1.2, $i := i+1$ is executed, but this is only for conceptual simplicity, as $L_n = A - \Sigma_{i=1}^{n-1} L_i$. Hence, it is sufficient to execute the steps only $n-1$ times and still obtain the same result. The condition $\forall \vec{p}_i \in S_i, \exists F_k | \vec{p}_i \in F_k, k > i\}$ is based on the assumption that the subtrahend surfaces $S_i$ are determined in ascending order, i.e. that i increases by one after a subtrahend surface $S_i$ has been determined for particular i. This sequence is not necessary, but if it is released the condition "k>i" would read "wherein i may take any value for which a subtrahend surface $S_k$ has not yet been determined". Both wordings are equivalent, as by renumbering the beam sources the same sequence of determining the subtrahend surfaces $S_i$ can be obtained, while taking care that the index i steadily increases by 1 after a particular subtrahend surface has been determined.

Of course, the method can be repeated for each layer and hence the time for manufacturing a workpiece is minimized. For a given powder bed fusing apparatus, the cost for manufacturing the workpiece is reduced.

To reiterate it vividly, the subtrahend surfaces $S_i$ are thus subsets of vectors of the area A, being selected such that the expected time$<t_i>$ for irradiating the surface given by the set of locations $L_i := IS_i - S_1$ equals the optimum fusing time $t_o(i)$ with an accuracy being given by the selection of $\alpha_i$, $\beta_{t,i}$. Assuming that $t_o(i) \cdot R_i < |IS_i|$ is true for all i and $\alpha = 0$ as well as $\beta_{t,i} = 0$ then $<t_i> = t_o(i)$ $\forall_i$, i.e. the total time $t_{tot}$ being required to fuse the area A using the n beam sources simultaneously is $t_{tot} = \text{Max}(t_o(i))$ and identical to the lower limit being inherent to the apparatus and the material to be fused. At this point it should be recalled that in practical applications, a workpiece may have thousands of layers, and thus small savings in irradiating an area on each layer accumulate to non-negligible cost savings.

Once $S_i$ has been determined for a given i, the $i^{th}$-set of locations $L_i$ can be determined using $L_i := IS_i - S_i$ (step 1.3.2) and the method may proceed with fusing the corresponding set of locations of $L_i$ using the $i^{th}$-beam source (step 1.4). Before continuing to execute step 1.4, preferably at least the steps 1.2 to 1.3.2 are repeated for each other beam source, i.e. for all remaining beam sources ($1 < i \leq n$). Step 1.4 may be preferably executed for at least two different $L_i$, $L_j$, ($i \neq j$) at the same time. The higher the number of beams that are irradiating their correspondingly assigned surfaces $L_i$ simultaneously the better. Preferably, all n beam sources irradiate at the same time.

In case the size of a section $L_i$ is below a given threshold, e.g. below the threshold $T_i$ explained above, the section $L_i$ may be set to zero ($L_i := \{\ \}$), which is equivalent to reducing the number of beam sources to $n-1$, i.e. an $i^{th}$-_beam source may be removed from the pool of n beam sources, if $|L_i| < T_i$.

There may be cases in which the overlap between the area A and a field of view $F_i$ is so small that the time required to irradiate the corresponding interesting set $IS_i = A \cap F_i$ is smaller than the optimum time $t_o(i)$, in this case $t_o \cdot R_i > |IS_i|$ is true. In this case one could simply assign $L_i := IS_i$ but in practice it may be necessary to have a defined shape of $L_i$ or that $L_i$ does not extend in predefined sectors of the area A. Thus, more generally, a subtrahend surface $S_i$ is defined with $S_i \subset IS_i$ under the condition that for each $\vec{p}_i \in S_i, \exists F_k | \vec{p}_i \in F_k$, $k > i$. Further, in the case of $t_o \cdot R_i > |IS_i|$ then $|S_i|$ may preferably be minimized. Once $S_i$ hast been determined, the set of locations $L_i$ to be irradiated by the $i^{th}$-beam source is determined using $L_i := IS_i - S_i$, i.e. the method may continue to step 1.4.

The condition "for each $\vec{p}_i \in S_i, \exists F_k \vec{p}_i \in F_k, k > i$" reads in plain language that for each vector $\vec{p}_i$ which vector $\vec{p}_i$ is an element of the subtrahend surface $S_i$ exists at least one field of view $F_k$ such that the field of view $F_k$ includes the vector $\vec{p}_i$, wherein the index k is larger than the index i. This condition ensures that any point/location of the area A being removed from the intersecting set $IS_i$ can be irradiated by at least one other beam source for which the set of locations $L_k$ has not yet been determined, the latter following from $k > i$. Any location of the area A which can be fused by only by a limited number of beam sources forming a set of indices X may thus be assigned at latest to a set of locations $L_{Max(X)}$ with the highest index of said set X.

The corresponding expectation value of the time for irradiating the surface of the layer with the $i^{th}$-beam source reads identically to the other case $<t_i> = L_i / R_i$. Generalizing, one may say that in case $t_o \cdot R_i \geq |IS_i|$, i.e. in the "ELSE" case of step 1.3 (i.e. if $(t_o \cdot R_i \geq |IS_i|)$, steps 1.3.1 and 1.3.2 may be executed while the condition $(1-\alpha_i) \cdot (|IS_i| - t_o \cdot R_i) \leq |S_i| \leq (1+\alpha_i) \cdot (|IS_i| - t_o \cdot R_i)$ may be released.

Preferably, particularly in case $t_o \cdot R_i \geq |IS_i|$ (but generally in any case), a corrected minimum time $t_o(i+1)$, as well referred to as t, may be calculated in a subsequent iteration of step 1.1 (i.e. after setting $i := i+1$) using e.g.

$$t_o(i) := t_o(i-1) + \frac{(t_o - \langle t_{i-1} \rangle) \cdot R_{i-1}}{\Sigma_{j=i}^{j \leq n} R_j}.$$

The corrected minimum time may then be used in future executions of steps 1.3 to 1.3.2 and instead of an initially calculated or estimated optimum fusing time. This adjustment of the optimum time $t_o(i)$ enhances an even load distribution between the beam sources for which the set of locations has not yet been determined, i.e. the variation of $|L_j|$ ($i < j \leq n$) is reduced. This provides a further increase in efficient use of the apparatus' capabilities and hence translates in lower manufacturing costs of a corresponding workpiece.

The step of calculating a corrected minimum time can be generalized by recalculating a (corrected) minimum optimal time with each iteration, i.e. in step 1.1 $t_o(i)$ may be $$t_o(1) = (1 \pm \beta_t(i)) \frac{|A|}{\sum_j^n R_j}$$

and $t_o(i) = (1 \pm \beta_{t,i}) \cdot \left( t_o(i-1) + \frac{t_{o(i-1)} \cdot R_{i-1} - |L_{i-1}|}{\sum_{j=i}^n R_j} \right) \forall\, 2 \le i \le n,$ being equivalent to $$t_o(i) = (1 \pm \beta_{t,i}) \frac{|A| - \sum_{j=1}^{i-1} |L_j|}{\sum_{j=i}^n R_j}$$

wherein if i=0 the term $\sum_{j=1}^{i-1} |L_j| := 0$ and hence $$t_o(1) = (1 \pm \beta_{t,i}) \frac{|A|}{\sum_{j=1}^n R_j}.$$

Again, the preferred case may be $\beta_t(i)=0$ and i indicates the $i^{th}$-execution of the steps. As already apparent, $\beta_{t,i}$ as defined above serves as an error margin and $t_o(i)$ may be selected to be within boundaries being given by selection either the "+" or the "−" of "±". Generally, $\beta_{t,1}=\beta_t(i)$ can be different for every iteration only for simplicity we will write $\beta_t$ as well. The of step calculating a corrected minimum time may be particularly useful if the effects of non-negligible $\alpha_i$ sum up. In short both possibilities account for a potential difference between the optimum mean fusing time $t_o$ and the actually expected fusing times $<t_i> = |L_i|/R_i$ for each iteration of the calculation of $L_i$. If not addressed, these differences may lead to the situation that $|L_n|$ may be significantly bigger that all other $L_j$, $(1 \le j < n)$, and hence significant idle times of the beam sources 1 to n−1 reduce the efficiency of the additive manufacturing process. Thus, again the step of recalculating an updated optimum mean fusing time further contributes to reducing the operating costs per workpiece.

In case the size of a section $L_i$ is below a given threshold, e.g. below the threshold TL explained above, the section $L_i$ may be set to zero ($L_i := \{\,\}$), which is equivalent to reducing the number of beam sources to n−1, i.e. an $i^{th}$-beam source may be removed from the pool of n beam sources, if $|L_i| < T_i$. Of course, in this case it may be preferred to calculate a corrected minimum time and/or a corrected optimum size of a corresponding fusing area $|L_i^{opt}|$.

The threshold $T_i$ may be defined for each $i^{th}$-beam source individually. It may as well be set manually for each beam source individually or for all or a number of beam sources, e.g. based on the experience of an operator. In a preferred example, the threshold TL may be a set portion of the optimum size of the fusing area $|L_i^{opt}|$, e.g. $T_i = c_{T_i} \cdot |L_i^{opt}|$, wherein $c_{T_i} \in \{0.95, 0.9, 0.8, 0.7, 0.6, 0.5, 0.4, 0.3, 0.2, 0.1, 0.05\}$.

Preferably, the method may further include to define at least a first (preferably meandering) line $B_{i,j}$ and preferably as well a second (preferably meandering) line $B_{i,k}$, wherein the first (preferably meandering) line $B_{i,j}$ extends (preferably meanders) in a first direction $\vec{b}_1$ and the second (preferably meandering) line $B_{i,k}$ extends (preferably meanders) in a second direction $\vec{b}_2$ (step 4.1). The first (preferably meandering) line may be used to limit the extension the subtrahend surface $S_i$ in a direction being at least essentially orthogonal to the first direction $\vec{b}_1$. Similarly, the second (preferably meandering) line may be used to limit the extension the subtrahend surface $S_i$ in a direction being at least essentially orthogonal to the second direction $\vec{b}_2$. At least one of the first and second (preferably meandering) lines hence determines a first boundary of the subtrahend surface $S_i$ (step 4.2). At least one of these first and second (preferably meandering) lines may be shifted to reduce $\Delta S_i$, wherein $\Delta S_i = |t_o(i) \cdot R_i - ||S_S - S_i|||$. Further preferably, when determining an $S_j$ after another $S_i$ (i.e. i<j) and if the $i^{th}$-beam source and the $j^{th}$-beam source are neighbours (or at least have overlapping fields of view), then $B_{j,i} = B_{i,j}$.

During this shifting, the first (preferably meandering) line $B_{i,j}$ may preferably be shifted at least essentially orthogonal to the first direction $\vec{b}_1$ and/or the second (preferably meandering) line may preferably be shifted at least essentially orthogonal to the second direction $\vec{b}_2$ to reduce $\Delta S_i$, preferably until the condition 1.3.1 is met. As already apparent the two vectors $\vec{b}_1$, $\vec{b}_2$ are preferably linearly independent (condition 5), and particularly preferred they may be at least essentially orthogonal to each other, i.e. preferably $\vec{b}_1 \perp \vec{b}_2$. Exceptionally the indices of the vectors $\vec{b}_1$, $\vec{b}_2$, ... are not associated with a beam source, these serve only to distinguish these vectors. The indices of the lines $B_{i,j}$ however are preferably associated to two beam sources, namely to the $i^{th}$- and to the $j^{th}$-beam source, after determining all $L_i$, the (preferably meandering) line $B_{i,j}$ separates the sets of locations $L_i$ and $L_j$.

A line $B_{i,j}$ meanders along or in the direction $\vec{b}_1$ if the line $B_{i,j}$ has a first end point $\vec{b}_{i,j,e}$ that obeys the condition $|\vec{b}_1 \cdot (\vec{b}_{i,j,l} - \vec{b}_{i,j,e})| \ne \|\vec{b}_1 \cdot (\vec{b}_{i,j,m} - \vec{b}_{i,j,e})\| \forall \vec{b}_{i,j,l}, \vec{b}_{i,j,m} \in B_{i,j}, \vec{b}_{i,j,l} \ne \vec{b}_{i,j,m}$ and if $|\vec{b}_\perp \cdot (\vec{b}_{i,j,l} - \vec{b}_{i,j,e})| \ne |\vec{b}_\perp \cdot (\vec{b}_{i,j,m} - \vec{b}_{i,j,e})| \forall \vec{b}^{i,j,l}, \vec{b}_{i,j,m} \in B_{i,j}, \vec{b}_{i,j,l} \ne \vec{b}_{i,j,m}$ with $\vec{b}_\perp \perp \vec{b}_1$ does not hold true.

Fusing the fusible material at the set of locations $L_i$ may include pivoting the $i^{th}$-beam source while the $i^{th}$-beam source projects an $i^{th}$-beam spot to thereby move the $i^{th}$-beam spot along lines being multiples of a vector $\vec{v}_i$. In a preferred example, the meandering lines include or consist of concatenated sections being, in alternating sequence, perpendicular to $\vec{v}_i$ or parallel to $\vec{v}_i$ (step 6).

Particularly preferred, the method further includes to execute the steps 1.2 and 1.3 (and optionally of course as well all other steps) first for the beam source that has a field of view which has the least overlap with the fields of view of other beam sources. Next, the steps are executed for the beam source which field of view has the second least overlap with other fields of view and so. This helps to reduce the computational effort when calculating the corresponding subtrahend surfaces $S_i$, as in this way first those portions of the area are assigned to a set of locations $L_i$ that in the worst case can be irradiated only by a single beam source, which may—if not accounted for-yield to the situation that a single beam source operates much longer than the others. Executing the steps 1.2 and 1.3 (and optionally of course as any of the other steps) first for the beam source that has a field of view which has the least overlap with the fields of view of other beam sources and so on may be obtained by sorting the indices of the beam sources such that the first (i=1) beam source has the field of view $F_1$ that has the least overlap and second (i=2) beam source has the field of view $F_2$ with the second least overlap and so forth. In other words, this means that preferably initially, but at latest prior to step 1.2 the indices of the fields of view $F_i$ are preferably sorted to obey the condition $Min(\Sigma_j^{i \neq j} F_i \cap F_j) \leq Min(\Sigma_j^{i+1 \neq j} F_{i+1} \cap F_j)$ $\forall i<n$ and that at least the steps 1.2 and 1.3 are repeated while increasing the value of the index with each repetition by one until the index i=n. Of course, for those $F_i$ for which $F_i \cap A = \{\ \}$ sorting can be omitted as it is clear that the corresponding set of locations $L_i$ is empty, i.e. $L_i = \{\ \}$.

In addition or alternatively, the method may include (as well prior to step 1.2), sorting the indices of the fields of view $F_i$ to obey the condition $|F_i \cap A| \leq |F_j \cap A| \forall i<j$ and that steps 1.2 and 1.3 and optionally at least one of the steps 2.1 to 2.3 are repeated while increasing the value of the index with each repetition by one. Again, the position of the beam sources having an index i for which $F_i \cap A = \{\ \}$ can be selected arbitrarily. As well, this sorting step eases determining the subtrahend surfaces $S_i$, while maintaining the error margin $\alpha_i$ small, i.e. to reduce avoidable idle times of beam sources that generally could contribute to fusing the area A.

The method may further include, prior to determining a subtrahend surface $S_i$ to assigning a portion $C_i$ of the area A to a dedicated $i^{th}$-beam source. In practice the beam sources are calibrated to operate all in the same coordinate system. This calibration, however, is not perfect and can deteriorate during the process of manufacturing. When assigning particular portions $C_i$ of the area A a priori to a certain dedicated $i^{th}$-beam source, imperfections of the workpiece can be reduced in this portion $C_i$, thus $C_i \subset F_i$, i.e. the portion $C_i$ is within the field of view $F_i$. Normally, such an assignment increases the total manufacturing time, because the load distribution between the different beam-sources is deteriorated. In an embodiment, this deterioration can be avoided by considering the additional constraint $S_i \cap C_i = \{\ \}$ when determining the subtrahend surface Si, e.g. in steps 1.3.1 and/or 2.1. Obeying the additional constraint $S_i \cap C_i = \{\ \}$ ensures, that the portion $C_i$ is a subset of the subsequently determined set of locations $L_i$ being later irradiated by the $i^{th}$-beam source, and that the additional size of the set of locations $L_i$ being due to the portion $C_i$ is considered in the load balancing constraint $(1-\alpha_i) \cdot (|IS_i| - t_o \cdot R_i) \leq |S_i| \leq (1+\alpha_i) \cdot (|IS_i| - t_o \cdot R_i)$ of steps 1.3.1.

In an embodiment, when repeating step 1.2, the intersecting sets $IS_j$ ($j \geq 2$) are determined as $IS_j := (A - \Sigma_{i=1}^{i<j} L_i) \cap F_j$. This step provides a number of advantages: The memory requirements are reduced and further determining a suited subtrahend surface $S_i$ is significantly simplified, leading to further cost optimizations. The idea underlying this improvement is that those portions of the field of view $F_i$ that already have been assigned to sets of locations $L_i$, ($i<j$) in previous executions i of at least one of the steps 1.2 to 1.3.2 and/or 1.2 to 2.3 do not need to be included in further considerations. As $\Sigma_{i=1}^{1<0} L_i = 0$, the condition $j \geq 2$ can be released, i.e. $IS_j$ may be defined as $IS_j := (A - \Sigma_{i=1}^{i<j} L_i) \cap F_j \forall j \in I \forall j \in I$ During the fusing process, i.e. during operation of the beam sources it may be preferred to establish an inert gas flow over the top of the powder bed to thereby remove fumes and other residues out of the fields of view $F_i$. Preferably, a flow in a flow direction parallel to the top surface of the layer may be established, e.g. by arranging at least one inlet nozzle at a first side of the top layer and at least one outlet nozzle at the opposite side of the top layer and by establishing an inert gas flow from the inlet nozzle to the outlet nozzle, thereby defining a main flow direction. In other words, the method may further include establishing an inert gas flow in a flow direction $\vec{d}$ over the top of the powder bed, wherein $\vec{d}_h$ denotes the (preferably normalized) component of the flow direction being parallel to the layer of fusible material, i.e. the projection of the flow direction $\vec{d}$ onto the area A. For example, if the z-axis is perpendicular to the surface of the layer of fusible material (and hence to the area A), then using cartesian coordinates $$\vec{d}_h = (d_x^2 + d_y^2)^{-\frac{1}{2}} (d_x, d_y, 0)^T,$$

wherein $(d_x^2 + d_y^2)^{-1/2}$ is only a normalization factor setting $|\vec{d}_h| = 1$, and can be omitted. As usual $d_x$, $d_y$ and $d_z$ are the x-, y- and z-components of the vector $\vec{d}$, respectively.

This flow direction parallel to the layer $\vec{d}_h$ may preferably be correlated with the extension of the meandering lines $B_{i,j}$ limiting the subtrahend surfaces $S_i$ and which define the boundary between adjacent sets of locations $L_i$ and $L_j$ such that the boundary $B_{i,j}$ between two sets of locations $L_i$ and $L_j$ has a first end point $\vec{b}_{i,j,e}$ that obeys the condition $|\vec{d}_h \cdot (\vec{b}_{i,j,l} - \vec{b}_{i,j,e})| \neq |\vec{d}_h \cdot (\vec{b}_{i,j,m} - \vec{b}_{i,j,e})| \forall \vec{b}_{i,j,l}$, $\vec{b}_{i,j,m} \in B_i$, $\vec{b}_{i,j,l} \neq \vec{b}_{i,j,m}$ (condition 13.1). This means that any distance between the first end point $\vec{b}_{i,j,e}$ and any other point $\vec{b}_{i,j,l}$ of the boundary B exists only once. Hence, any subsection of $B_{i,j}$ has a non-vanishing extension in the direction defined by the horizontal component of the flow direction $\vec{d}_h$. In this case the relation $|\vec{d}_o \cdot (\vec{b}_{i,j,l} - \vec{b}_{i,j,e})| \neq |\vec{d}_o \cdot (\vec{b}_{i,j,m} - \vec{q}_e)| \vec{b}_{i,j,l}$, $\vec{b}_{i,j,m} \in B_i$, $\vec{b}_{i,j,m}$ (condition 13.2) with $\vec{d}_o \perp \vec{d}_h$ is preferably not realized, thus $B_{i,j}$ is not a straight line but may meander essentially parallel to the horizontal component of the flow direction $\vec{d}_h$.

Alternatively, the boundary $B_{i,j}$ may meander orthogonal to the horizontal component of the flow direction $\vec{d}_h$. In this case the relation $|\vec{d}_o \cdot (\vec{b}_{i,j,l} - \vec{b}_{i,j,e})..\neq| \vec{d}_o \cdot (\vec{b}_{i,j,m} - \vec{q}_e)| \forall \vec{b}_{i,j,l}$, $\vec{b}_{i,j,m} \in B_i$, $\vec{b}_{i,j,l} \neq \vec{b}_{i,j,m}$, wherein $\vec{d}_o \perp \vec{d}_h$ is obeyed, while condition $|\vec{d}_h \cdot (\vec{b}_{i,j,l} - \vec{b}_{i,j,e})| \neq |\vec{d}_h \cdot (\vec{b}_{i,j,m} - \vec{q}_e)| \vec{b}_{i,j,l}$, $\vec{b}_{i,j,m} \in B_i$, $\vec{b}_{i,j,l} \neq \vec{b}_{i,j,m}$ (condition 13.1) may preferably not be realized.

These measures being referenced to as conditions 13.1 and 13.2 each vastly simplify to coordinate the movement of the n beam spots over the layer such that at any moment in time no beam spot is below fume that has been generated by another beam spot, while operating the beam sources simultaneously.

As stated above, the beam sources may be pivoted while irradiating the surface to thereby project beam spots onto the layer. Thus, preferably each beam spot may be moved over the surface of the layer and thereby fuses the fusible material at the locations $\vec{l}_i$ of the respective set of locations $L_i$. In other words, fusing the fusable material at the set of locations $L_i$ includes pivoting the $i^{th}$-beam source while the $i^{th}$-beam source projects the $i^{th}$-beam onto the area A to thereby move the $i^{th}$-beam spot. Preferably the movement of the $i^{th}$-beam spot can be described by a multiple of a vector $\vec{v}_i$ having a component being opposite to the flow direction $\vec{d}_h$ of the inert gas flow. The beam spot so to speak moves towards the gas inlet and hence the fusing process is less affected by fumes previously produces by said beam spot.

Subsequently, the beam source may be switched of and repositioned to continue irradiating another subset of $L_i$ while moving again in the direction being defined by $\vec{v}_i$. The quality of the workpiece to be manufactures is increased accordingly.

For example, there may be at least two different meandering lines $B_{i,j}$, $B_{q,r}$, which are the boundaries between adjacent sets of locations $L_i$, $L_j$ and $L_q$, $L_r$, respectively. Preferably, an end point of the first section $B_{i,j}$ may as well be an end point of the first section $B_{q,r}$. This measure aligns the corresponding sets of locations $L_i$, $L_j$, $L_q$ and $L_r$, preferably parallel and orthogonal to the flow direction $\vec{d}_h$ being parallel to the layer. The latter can be obtained when, including the constraint on $S_i$ that condition 13.1 or 13.2 applies to both, $B_{i,j}$ and $B_{q,r}$. Thereby the computational effort of the method can be further reduced and idle times to avoid beam spots at locations of fume being produced by other beam spots can be reduced. Thus, the quality of the workpiece can be enhanced while at the same time manufacturing cost for a workpiece are reduced.

For example, if condition 13.1 applies to both, $B_{i,j}$ and $B_{q,r}$, the sets of locations $L_i$, $L_j$, $L_q$ and $L_r$, may be separated into m portions $L_{s,1}$, $L_{s,2}$, ..., $L_{s,m}$, (m≥2) by lines meandering parallel to $\vec{d}_h$ and wherein $|L_{s,i}|=|L_{s,n}|\pm 0.15|L_{s,n}| \forall s \in \{i,j,q,r\}$, l, n≤m, l≠n, (the factor 0.15 can be replaced by any other value of {0.1, 0.05, 0.025, 0.1, 0.005}) wherein portions with the same second index are aligned parallel to $\vec{d}_h$ and in that only portions with the same second index are irradiated simultaneously. This provides for a very effective and simple measure to avoid that fumes being produces by any beam spot affects fusing of the fusible material by another beam spot. An increase of the number of portions enables to increase the minimum distance between two beam spots measured perpendicular to the vector $\vec{d}_h$. Meandering parallel or orthogonal to $\vec{d}_h$ means that the distance measured parallel, or orthogonal, respectively, to $\vec{d}_h$ between an end point of the respective line and any other point of said line is unique (condition 13.1 or 13.2, respectively, applies to said line).

Preferably, the area A may be separated into at least 2n stripes (generally into c·n stripes, wherein c is an integer with c≥2) extending at least essentially parallel to the horizontal component $\vec{d}_h$ of the inert gas flow. Preferably, during fusing only locations $l_i$ in every second stripe are fused at the same time. Thus, in between of two beam spots may be at least a distance corresponding to the width of the corresponding. By choosing the width of the stripes, one can avoid that any beam spot fuses at a location with a significant concentration of fumes which has been produced by another beam spot. Thus, between two stripes being irradiated simultaneously, there are c−1 stripes which are not irradiated, and their width may be the minimum distance by which two beam spots are separated. As already apparent, the boundaries of at least some of the stripes are preferably given by the meandering lines as explained above.

Only to avoid any misunderstanding, we recall that as usual the layer is the top layer of a powder bed. Further, herein, as usual "{ }" symbolizes an empty set. Herein we use as well the number "0" to express that a set is empty, i.e. if a set V is empty is can be expressed as V={ } as well as V=0.

Herein at "least essentially perpendicular" or "least essentially orthogonal" expressed, that an angle of 90° is preferred, but that deviations may be accepted, the angle may thus be within 90°±45°, 90°±30°, 90°±15°, 90°±10°, 90°±5°, 90°±2.50, 90°±1° or 90°±0°. Similarly, "least essentially parallel" allows for deviations from perfect parallel alignment, i.e. angles be within 0°±45°, 0°±3°, 0°±15°, 0°±10°, 0°±5°, 0°±2.5°, 0°±1°, or 0°±0° may be selected as well, wherein exactly parallel (±0°) is preferred. Further, two meandering lines meandering in the directions being given by vectors $\vec{b}_1$ and $\vec{b}_2$ are considered to be perpendicular or parallel, if these vectors $\vec{b}_1$ and $\vec{b}_2$ are perpendicular or parallel, respectively.

BRIEF DESCRIPTION OF THE DRAWINGS

In the following, the invention will be described by way of example, without limitation of the general inventive concept, on examples of embodiment and with reference to the drawings.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 1:
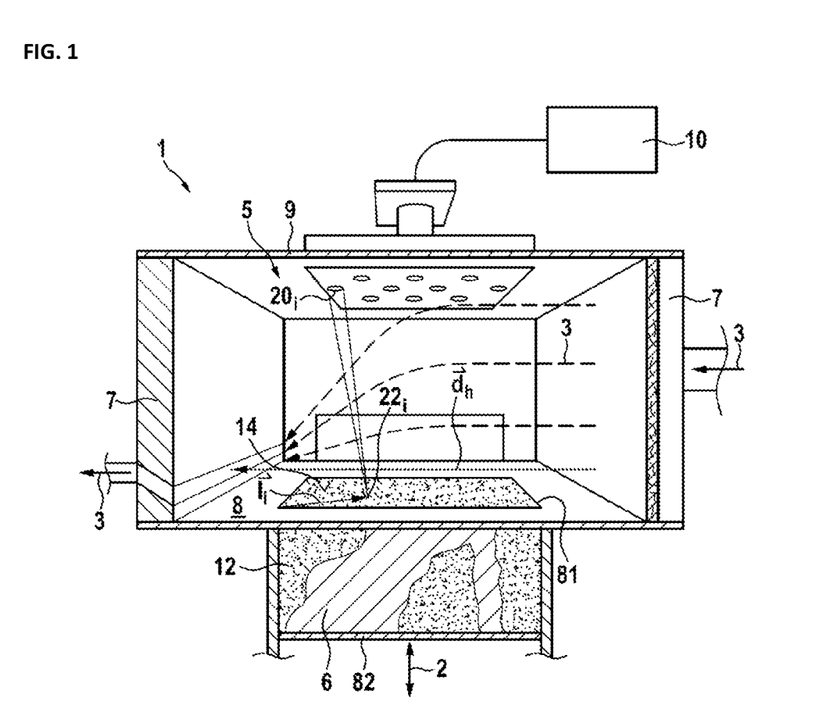
FIG. 1 shows an additive manufacturing apparatus.

In FIG. 1 a first embodiment is shown. The additive manufacturing apparatus 1, is shown in a sectional view and has a process chamber 5, being enclosed by sidewalls 7, a bottom 8 and a ceiling 9. In the bottom is an opening 81. Below the opening may be a movably supported support 82 as indicated by the double headed arrow 2. On the top of the support may be a powder bed 12 having a top layer with a surface 14. As sketched, a portion of a workpiece 6 may be embedded in the powder bed 12.

The surface 14 of the powder bed in FIG. 1 can be irradiated by beam spots $22_i$ being projected by n beam sources $20_i$. Depicted is a number of n=8 beam sources $20_i$ but this is only a preferred example, any other number n≥2 could have been chosen as well. For example, in FIG. 2 The powder particles of the powder bed 12 at locations $\vec{l}_i$ that are irradiated are by the $i^{th}$-beam spot $22_i$ being emitted by the $i^{th}$-beam source $20_i$ are fused together. In FIG. 1 only a single beam spot $22_i$ and a single location $\vec{l}_i$ are indicated for simplicity, in practice, however, it is preferred if at least two beam spots $22_i$, e.g., at least three, at least four or at least five beam spots $22_i$ are emitted at the same time. Preferably all n beam sources $20_i$ may each emit a beam spot $22_i$ to a location $\vec{l}_i$ (i.e. $1 \leq i \leq n$) at the same time. The beam-sources $20_i$ may be pivoted, hence the beam spots $22_i$ may be moved over the surface 14 and each beam source $20_i$ may irradiate a set of locations $L_i = \{\vec{l}_i\}$, wherein the index i indicates the corresponding beam source $20_i$ of the n beam sources. Once all sets of locations $L_i$ have been irradiated an area $A = \Sigma_{i=1}^{n} L_i$ has been irradiated (see FIG. 2). The area A may thus be a top surface of the corresponding layer of the workpiece 6 or at least a portion thereof. Once the area A has been irradiated, the support may be lowered by the thickness of a powder layer and a new powder layer may be applied, e.g. using a so called recoater, travelling over the opening 81. Subsequently, the next surface 14 of the new upmost layer of the powder bed 12 may be irradiated using the beam sources $20_i$.

During fusing of the powder bed's surface 14 fumes occur at the locations $\vec{l}_i$ of the surface. These fumes may be removed from the process chamber by establishing an inert gas flow 3 above and over the surface 14 of the powder bed 12 being symbolized by dashed arrows 3. The dashed arrows 3 each have common projection on the bottom 8, being symbolized the dotted arrow $\vec{d}_h$. The vector $\vec{d}_h$ is thus the direction of the horizontal component of the inert gas flow 3 above and over the surface 14. In other words, the inert gas flow 3 has a component $\vec{d}_h$ being parallel to the support's up facing surface.

A programmable electronic circuitry 10, briefly referred to as controller 10, controls at least a number of the beam sources $20_i$. Preferably as well at least one of the inert gas flow 3, a recoater and the movement of the support 82 may be controlled by the controller 10.

Figure 2:
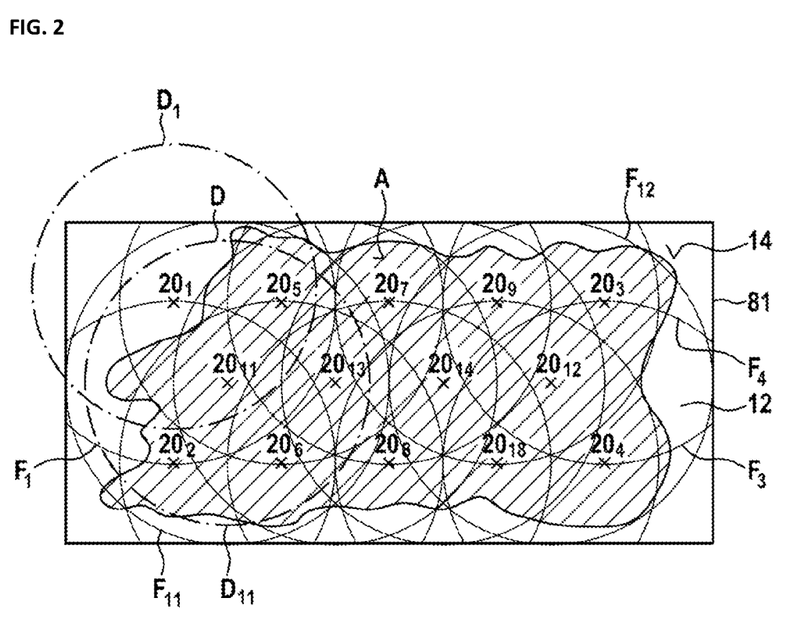
FIG. 2 shows a top view of the up facing surface of a powder bed.

FIG. 2 shows a top view of a surface 14 of a layer of a powder bed 12. Each cross $20_1$ to $20_{14}$ represents the position of a beam source $20_i$ (i.e. n=14 in this example) above the surface 14. Or in other words, the position of the crosses 20 can be obtained by a projection of the beam sources 20 onto the surface 14. Only to enable to reference to particular beam source 20, we added a subscript to each cross, i.e. $20_1$, $20_4$, indicate the cross representing the projection of the first beam source and of the fourth beam source, respectively. Generally, $20_i$, ($1 \leq i \leq n$) denotes the cross representing the $i^{th}$-beam source. Further, as already stated with respect to FIG. 1, the present choice of n=14 is only an example. The only condition on the number n of beam sources is that n≥2.

Each beam source $20_i$ can irradiate a certain portion $F_i$ of the surface 14. These surfaces $F_1, \ldots, F_{14}$ are referred to as fields of view $F_i$. FIG. 2 further shows an example area A. The embodiments enable to assign portions of the area A to the different beam sources and subsequently to fuse the powder in area A while operating a maximum amount of beam sources at the same time. Idle times of beam sources 20 are reduced. The area A can be calculated based on a CAD-model of the workpiece 5, wherein "CAD" stands for "Computer Aided Design" and a CAD-Model is hence a description of the workpiece enabling to manufacture it.

As already explained above, the beam sources are labelled with indices or in any other appropriate manner, that enables to distinguish two of them. Herein we assume that the sets of locations $L_i$ to be irradiated by the $i^{th}$-beam source $20_i$ are determined in an ascending order, starting with the first beam source $20_1$. This ascending order is not required, but simplifies to explain and understand the invention. Accordingly, the last set of locations $L_{14}$ is already defined if all other 13 sets have been determined, as it is the not yet assigned portion of the area A to be fused, i.e. $L_{14} = A - \Sigma_{i=1}^{13} L_i$ or for any number n of beam sources $L_n = A - \Sigma_{i=1}^{n-1} L_i$.

Figure 5:
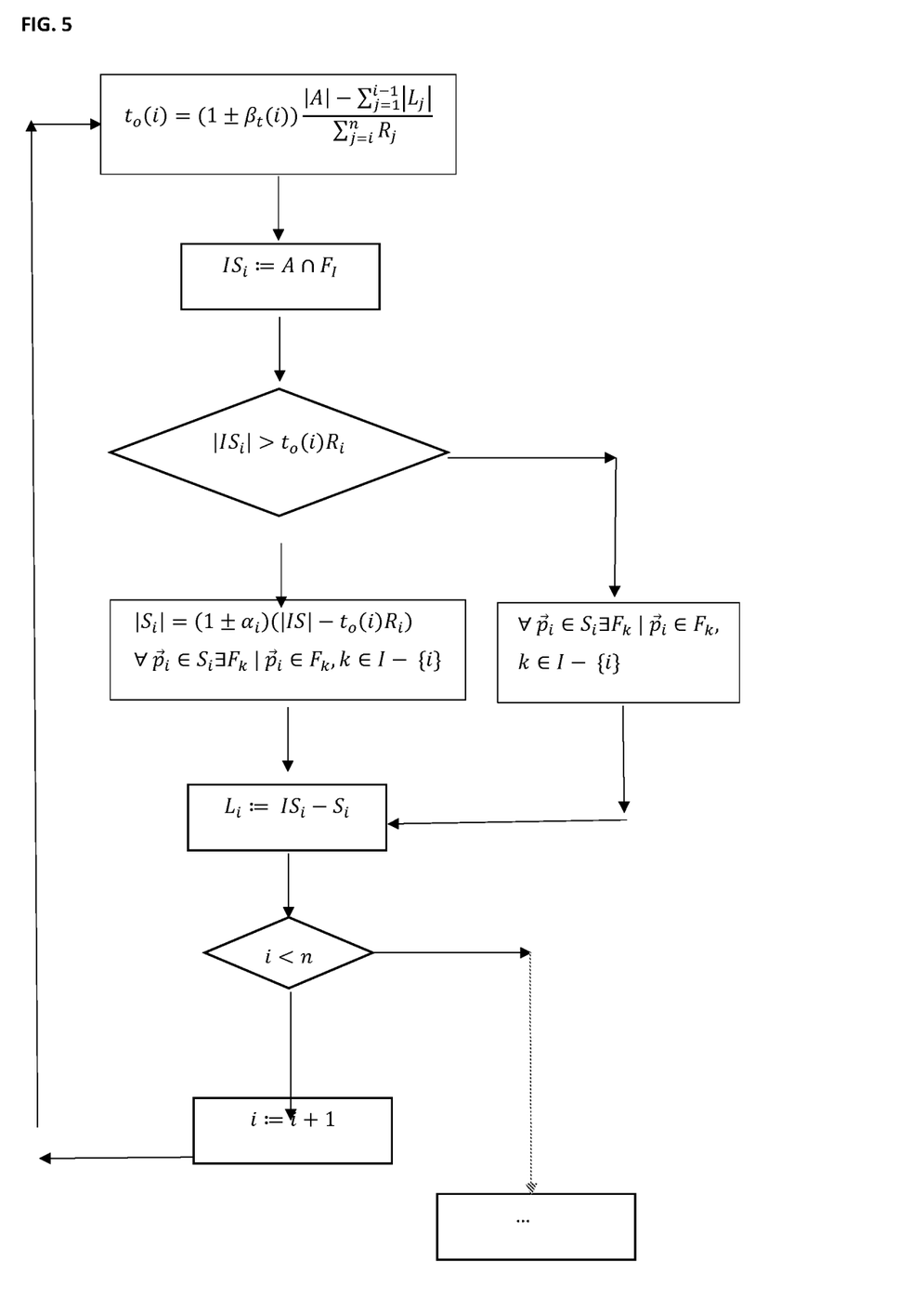
FIG. 5 shows a flow diagram of a method for determining sets of locations $L_i$.

Once the beam sources $20_i$ are labelled and the area A to be irradiated has been determined intersecting sets $IS_i$ of the fields of view $F_i$ with the area A may be determined, generally $IS_i = F_i \cap A$, as depicted in FIG. 5. The method may thus include at least determining $IS_1$: $= F_1 \cap A$. Further an optimum fusing time $t_o(1)$ may be determined. This may take place prior or after the step of determining $IS_1$. This optimum fusing time $t_o(i)$ can be considered as an estimate of the time being required to fuse a subsequently determined portion $L_i$ of the area A. In other words, the size of the set of locations $|L_i|$ may be determined such that it may be expected that the set of locations $L_i$ can be fused by the $i^{th}$-beam source $20_i$ within the optimum fusing time $t_o(i)$.

Preferably, the actual fusing times $t_a(i)$ are all the same and in this case the optimum fusing time of the first beam source can be estimated as $t_o(1) = |A|/\Sigma_{i=1}^{n} R_i$, wherein the values $R_i$ are the fusing rate of the $i^{th}$-beam source (see FIG. 5). As usual, the fusing rate $R_i$ of the $i^{th}$-beam source is the quotient of the size of a test surface T and the time $t_t(i)$ required to fuse said test surface, i.e.

$$R_i = \frac{|T|}{t_t(i)}.$$

This example of determining $t_o(i)$ is not the only valid choice for $t_o(i)$. Generally any value of $t_o(i)$ being withing $$\frac{(1 \pm \beta_{t,i})|A|}{\sum_{i=1}^{n} R_i} \left( \text{i.e. } t_o(i) = \frac{(1 \pm \beta_{t,i})|A|}{\sum_{i=1}^{n} R_i} \right)$$

may be considered reasonable, generally $$\frac{(1 - \beta_{t,i})|A|}{\sum_{i=1}^{n} R_i} \leq t_o(i) \leq \frac{(1 + \beta_{t,i})|A|}{\sum_{i=1}^{n} R_i}$$

can be considered as a reasonable range for the margin, e.g. $\beta_{t,i} \in B$, with B={0.25, 0.2, 0.15, 0.1, 0.05, 0.025, 0.0125, 0.01, 0.005, 0.001}. Smaller values of $\beta_{t,i}$ are preferred, particularly preferred may be $\beta_{t,i} = 0$.

If $t_o(1)$ has been determined, the method may proceed to determining the first subtrahend surface $S_1$ (see FIG. 5). The first subtrahend surface $S_1$ may be a subset of the first intersecting set $IS_1$, i.e. $S_1 \subset IS_1$ and as the name implies, subtracted from $IS_1$ to thereby determine the first set of locations $L_1$. When determining the first subtrahend surface $S_1$, only those points of the first intersecting set $IS_1$ can be considered which are as well included in other fields of view $F_k$, ($k \neq 1$). In more concise manner this can be expressed as $\forall \vec{p}_1 \in S_1, \exists F_k | \vec{p}_1 \in F_k$, k>1, reading that for all points $\vec{p}_1$ of the subtrahend surface $S_1$ exists a field of view $F_k$ such that these points $\vec{p}_1$ are element of at least one field of view $F_k$, wherein k may take any integer value greater than 1. This condition ensures that points being removed (subtracted) from the intersection set $IS_1$ can be irradiated by another beam source. Further, the size of $|S_1|$ may be adjusted to comply as good as reasonable with the constraint $(1-\alpha_1) \cdot (|IS_1| - t_o(1) \cdot R_1) \leq |S_1| \leq (1+\alpha_1) \cdot (|IS_1| - t_o(1) \cdot R_1)$. This implies that $|IS_1| \geq (1-\alpha_1) \cdot t_o(1) \cdot R_1$. As already explained above $\alpha_1 \in \{0.25, 0.2, 0.15, 0.1, 0.05, 0.025, 0.01, 0.005, 0\} \forall i$. The smaller $\alpha_1$ is selected the better, i.e. particularly preferred $\alpha_1=0$. Once $S_1$ has been determined the first set of locations $L_1$ which is to be irradiated by the first beam source can be determined as $L_i:=IS_1-S_1$.

There may be cases in which the constraint $(1-\alpha_1)\cdot(|IS_1|-t_o(1)\cdot R_1)\leq|S_1|\leq(1+\alpha_1)\cdot(|IS_1|-t_o(1)\cdot R_1)$ cannot be met, because the size of $IS_1$ may be smaller than $(1-\alpha_1)-t_o(1)\cdot R_1$ (see FIG. 5). In this case one may select $S_1:=\{\ \}=0$, but there may be other conditions to observe which may require to find a non-vanishing subtrahend surface $S_1$. This can be generalized into the following: If the constraint $(1-\alpha_i)\cdot(|IS_1|-t_o(i)\cdot R_i)\leq|S_i|\leq(1+\alpha_i)\cdot(|IS_i|-t_o(1)\cdot R_i)$ cannot be met, because the size of $IS_i$ (i.e. $|IS_i|$) may be smaller than $(1-\alpha_i)\cdot t_o(i)\cdot R_i$. In this case one may select $S_i:=\{\ \}=0$, but there may be other conditions to observe which may require or at least render it favourable to find a non-vanishing subtrahend surface $S_i$. An example for choosing a non-vanishing subtrahend surface $S_i$ is the case when the boundary between neighboured surfaces $L_i$, $L_j$ shall have a pre-defined shape.

As already explained above, it is preferred if the sets of locations $L_i$ have a size above a threshold $T_i$, i.e. if $|L_i|>T_i$. If this condition cannot be met, $S_i$ may be set to $IS_i$, i.e. $S_i:=IS_i$ being equivalent to removing the $i^{th}$ beam source from the pool of available beam sources.

Subsequently, these steps may be repeated for the next beam source, which in this example may be the second beam source. Formally this can be described as repeating the steps after replacing the index 1 by 2 and by using $t_o(2)$ instead of $t_o(1)$ (see FIG. 5). Hence this repetition provides the second set of locations $L_2$. In a more general manner one my say that once an $i^{th}$-set of locations $L_i$ has been determined or at least could be determined because $IS_i$ and $S_i$ are known, the method may be reiterated for all remaining beam sources or to say it differently $i:=i+1$ until $i=n$. In an explicit language this means that preferably a new optimum time $t_o(i)$ may be determined for every $i \in I$. Preferably the new optimum time takes into account any deviation of the time(s) that can be expected $\langle t_j \rangle$, $(j<i)$ to be required by the beam sources having a lower index. For example $$t_o(i+1) := t_o(i) + \frac{(t_o - \langle t_i \rangle) \cdot R_i}{\sum_{j=i+1}^{j \leq n} R_j},$$

more generally and to allow small deviations from the suggested optimum value one may determine the updated optimum time to obey the constraint $$(1 - \beta_{t,i}) \left( t_o(i-1) + \frac{t_{o(i-1)} \cdot R_{i-1} - |L_{i-1}|}{\sum_{j=i}^{n} R_j} \right) \leq t_o(i) \leq$$

$$(1 + \beta_{t,i}) \left( t_o(i-1) + \frac{t_{o(i-1)} \cdot R_{i-1} - |L_{i-1}|}{\sum_{j=i}^{n} R_j} \right) \forall 2 \leq i \leq n,$$

being equivalent to $$(1 - \beta_{t,i}) \frac{|A| - \sum_{j=1}^{i-1}|L_j|}{\sum_{j=i}^{n} R_j} \leq t_o(i) \leq (1 + \beta_{t,i}) \frac{|A| - \sum_{j=1}^{i-1}|L_j|}{\sum_{i=1}^{n} R_j}$$

or in short $$t_o(i) = (1 \pm \beta_{t,i}) \frac{|A| - \sum_{j=1}^{i-1}|L_j|}{\sum_{j=i}^{n} R_j}$$

wherein if $i=0$ the term $\Sigma_{j=1}^{i-1}|L_j|:=0$ and hence $$t_o(1) = (1 \pm \beta_{t,i}) \frac{|A|}{\sum_{j=1}^{n} R_j}.$$

Again, the preferred case may be $\beta_{t,i}=0$.

Next or as well prior to determining the updated optimum fusing time $t_o(i)$ the next intersecting set may be determined using $IS_i:=F_i \cap A$.

Once $IS_i$ and $t_o(i)$ are determined, the method may proceed to the step of determining the corresponding subtrahend surface $S_i$, wherein $S_i$ obey the condition $\forall \vec{p}_1 \in S_1$, $\exists F_k | \vec{p}_1 \in F_k$, $k>i$ and if $|IS_i| \geq t_o(i) \cdot R_i$ $S_i$ further obeys $(1-\alpha_i) \cdot (|IS_i|-t_o(i)\cdot R_i) \leq |S_i| \leq (1-\alpha_i)\cdot(|IS_i|-t_o(i)\cdot R_i)$, and $\alpha_i \in \{0.25, 0.2, 0.15, 0.1, 0.05, 0.025, 0.01, 0.005, 0\}$.

Once the $IS_i$ and $S_i$ are determined, the method may proceed to define $L_i:=IS_i-S_i$, and to increase i by one ($i:=i+1$, unless $i=n$) and reiterate the process until n sets of locations $L_i$, $1 \leq i \leq n$ have been determined. As already apparent, the $n^{th}$ set can as well be determined using $L_n=A-\Sigma_{i=1}^{n-1}L_i$. The controller may then control the beam sources $20_i$ to project their respective beam spots $22_i$ onto the corresponding sets of locations $L_i$.

Figure 3:
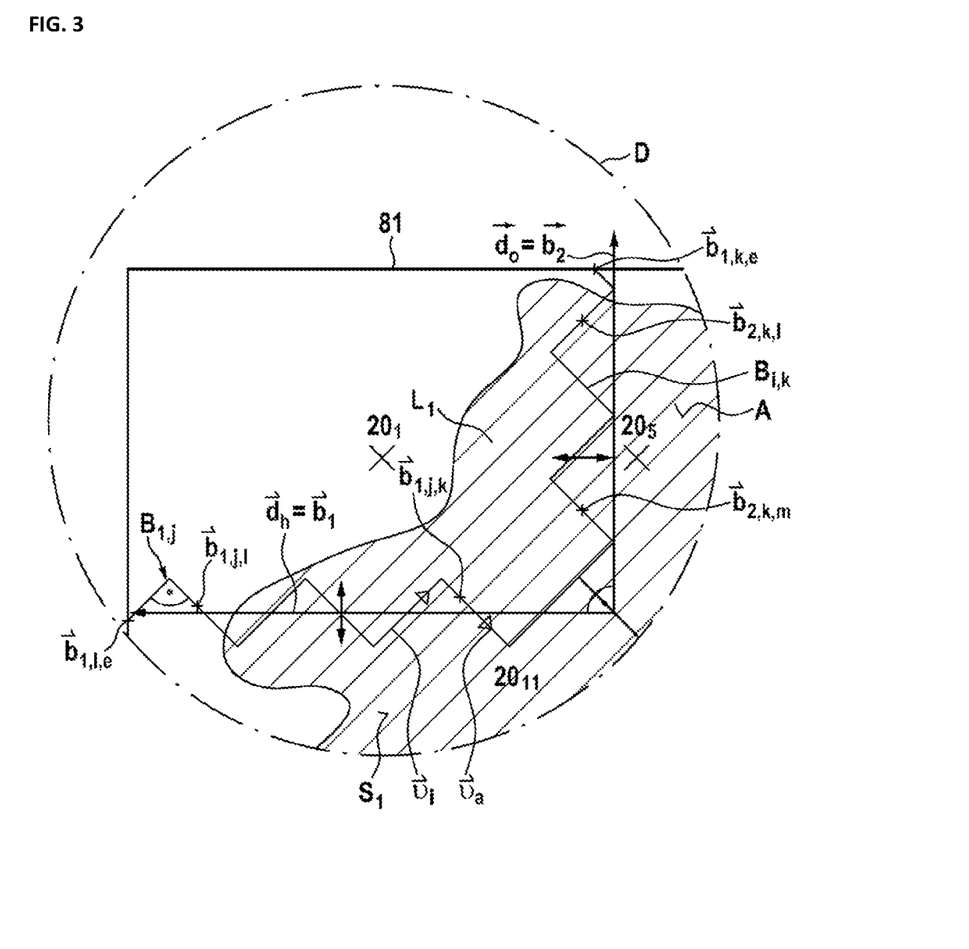
FIG. 3 shows detail $D_1$ of FIG. 2.

An example for determining a subtrahend surface Si is explained with respect to FIG. 3. FIG. 3 shows the detail D of FIG. 2 with some extra information: Determining a subtrahend surface Si may include to determine at least a first meandering line $B_{i,j}$. In the example of FIG. 3, there are two meandering lines, the first meandering $B_{1,j}$ line extends parallel to flow direction $\vec{d}_h$ and the second meandering line $B_{1,k}$ extends perpendicular to $\vec{d}_h$, i.e. parallel to $\vec{d}_o$ (thus $\vec{d}_o \perp \vec{d}_h$). As can be seen, the first meandering line has a first end point $\vec{b}_{1,i,e}$. The line $B_{i,j}$ meanders a long or in the direction $\vec{b}_1$ because the line $B_{1,j}$ as a first end point $\vec{b}_{1,j,e}$ and any point $\vec{b}_{1,j,l}$ on the meandering line $B_{1,j}$ has a unique distance to the first end point $\vec{b}_{1,j,e}$, thus the meandering line $B_{1,j}$ obeys the condition $|\vec{b}_1 \cdot (\vec{b}_{i,j,l}-\vec{b}_{i,j,e})| \neq |\vec{b}_1 \cdot (\vec{b}_{i,j,m}-\vec{b}_{i,j,e})| \forall \vec{b}_{i,j,l}, \vec{b}_{i,j,m} \in B_{i,j}, \vec{b}_{i,j,l} \neq \vec{b}_{i,j,m}$, while in this example $\vec{b}_1=\vec{d}_h$, being a preferred choice. Further orthogonal to $\vec{b}_1$ the distances of the points of the meandering line $B_{1,j}$ are not unique, i.e. $|\vec{b}_\perp \cdot (\vec{b}_{1,j,l}-\vec{b}_{1,j,e})| \neq |\vec{b}_\perp \cdot (\vec{b}_{1,j,m}-\vec{b}_{1,j,e})| \forall \vec{b}_{1,j,l}, \vec{b}_{1,j,m} \in B_{1,j}, \vec{b}_{1,j,l} \neq \vec{b}_{1,j,m}$ with $\vec{b}_\perp \perp \vec{b}_1$ does not hold true. In the depicted preferred example, the first meandering line $B_{1,j}$ has straight sections which can be described as multiples of a fusing vector $\vec{v}_i$, and further straight sections extending in an angle, preferably orthogonally, to the fusing vector $\vec{v}_i$. The corresponding vector is hence indicated as $\vec{v}_a$ The fusing vector $\vec{v}_i$ is a vector along which the $i^{th}$-beam spot may be moved over the surface while fusing the set of locations $L_i$.

In the example of FIG. 3 there is an optional second meandering line $B_{1,k}$ that meanders orthogonal to the first meandering line $B_{1,j}$. Thus $|\vec{b}_2 \cdot (\vec{b}_{1,k,i} - \vec{b}_{1,k,e})| \neq \vec{b}_1 \cdot (\vec{b}_{i,k,m} - \vec{b}_{i,k,e})| \forall \vec{b}_{i,k,l}, \vec{b}_{i,k,m} \in B_{1,k}, \vec{b}_{i,k,l} \neq \vec{b}_{i,k,m}$, while in this example $\vec{b}_2 = \vec{b}_0 = \vec{b}_1$. It is emphasised that this choice is only an example, other choices may be used as well. Preferably, $\vec{b}_1$ and $\vec{b}_2$ are linearly independent (i.e. $\vec{b}_1 \neq c \cdot \vec{b}_2 \forall c$).

When determining the subtrahend surface $S_1$ (more generally $S_i$) one may simply shift the meandering lines $B_{1,j}$ and $B_{1,k}$ (more generally $B_{i,j}$ and $B_{i,k}$). In a preferred example embodiment, the corresponding meandering lines $B_{i,j}$ and $B_{i,k}$ may be shifted at least essentially perpendicularly (i.e. within 90°±45°, ±30°, ±15°, 10°, ±5°, 2.5°, ±1° or ±0°) to their respective vectors $\vec{b}_1$ and $\vec{b}_2$ until the conditions for $S_i$ (more generally $S_i$) are obeyed. In other words, the lines $B_{i,j}$ and $B_{i,k}$ may define inner boundaries of the subtrahend surface $S_i$, while the outer boundary may be provided by the boundary of the corresponding field of view $F_i$, or preferably by the outer boundary of $IS_i$, wherein the terms "inner" and "outer" reference to the location being defined by the centre of the field of view $F_i$ of the respective $i^{th}$ beam source, being herein denoted by an "x" representing the corresponding projection of the $i^{th}$-beam source.

In the example of FIG. 3, only two meandering lines are required to determine the subtrahend surface Si. In this example this is due to the location of the area A relative to the center of the first field of view $F_1$ (generally, center of the the $i^{th}$-field of view $F_i$).

If the geometry and/or the location of the area A relative to an $i^{th}$-beam sources field of view $F_i$ is different, then three or four of the meandering lines may be required to determine the inner boundary of the subtrahend surface.

Figure 4:
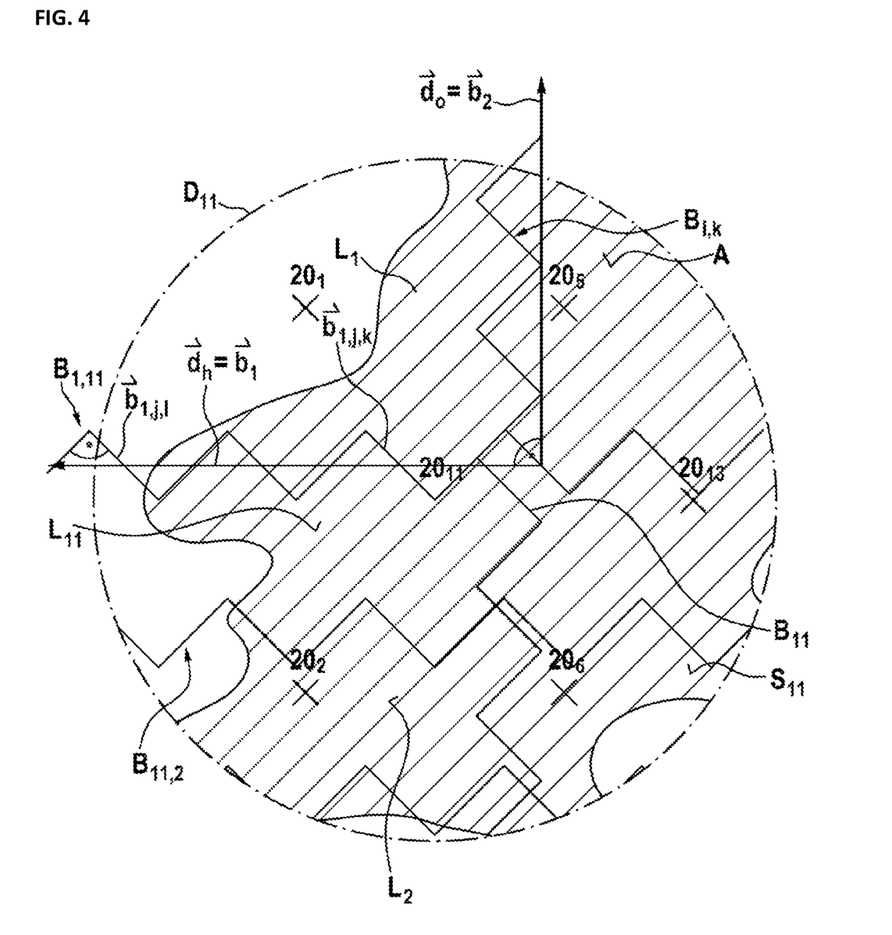
FIG. 4 shows detail $D_{11}$ of FIG. 2.

A corresponding example is shown in FIG. 4. FIG. 4 shows another detail of FIG. 2, being centred at the centre of the projection of the eleventh field of view $F_{11}$ of the $11^{th}$-beam source. Again, the number 11 is just an example and may be generalized. When determining the $11^{th}$-subtrahend surface $S_{11}$ one may again use meandering lines which in this case may be labelled $B_{11,j}$, $B_{11,k}$ and $B_{11,l}$. When determining $S_{11}$, the first set and second sets of locations $L_1$ and $L_2$ have already been determined and hence the $11^{th}$-intersecting set $IS_{11}$ may be limited by $B_{1,j'}$ and $B_{2,j''}$. As can be seen in FIG. 2, the left-hand portion of the surface being delimited by $B_{1,j'}$ and $B_{2,j''}$ may not be in the field of view $F_i$ or any other beam source than of the $11^{th}$-beam source. Thus, the constraint on $S_{11}$ that $\forall \vec{p}_{11} \in S_{11}, \exists F_k | \vec{p}_{11} \in F_k, k>i$ cannot be met for the points $\vec{p}_{11}$ in between of $B_{1,j'}$, $B_{2,j''}$ and to the left of the circle defining the boundary of $F\_13$. Thus, as matter of the conditions on $S_i$ it turns out that $j'=j''=11$ and one obtains $B_{11,1}:=B_{1,11}$ and $B_{11,2}:=B_{2,11}$. Thereby, only the position of a single meandering line, $B_{11,1}$ has to be determined by shifting it for example at least essentially perpendicular to $\vec{b}_2$, which in this example obeys $\vec{b}_2 \perp \vec{b}_h$. In FIG. 4 this shifting process is indicated by a double headed arrow. In other words, the meandering line $B_{11,1}$ (generally $B_{i,j}$) may be shifted until the remaining conditions on $S_{11}$ (as an example for Si are met). In the depicted example it is thus sufficient to determine the size of the surface being enclosed the contour of $IS_{11}$ and the meandering lines $B_{11,5}$, $B_{11,6}$ and $B_{11,1}$ to determine $|IS_{11}-S_{11}|$ (generally $|IS_i-S_i|$). If the size $|IS_{11}-S_{11}|$ is bigger (or smaller) then $(1\pm\alpha_i)\cdot t_o(i)\cdot R_i$, then the meandering line $B_{11,1}$ may be slightly shifted to the left (or right, respectively) until $(1-\alpha_i)\cdot(|IS_i|-t_o\cdot R_i) \leq |S_i| \leq (1+\alpha_i)-(|IS_i|-t_o\cdot R_i)$.

The method may next proceed with determining the next subtrahend surface $S_{i+1}$ (in the given example with $S_{11+1}=S_{12}$).

The example method can be implemented particularly easy, if the sequence of determining the subtrahend surfaces $S_i$ may be selected based on the ability of the $i^{th}$-beam source to contribute to fusing the area A. A measure for this ability to contribute can be considered as the size of the overlap of their respective fields of view $F_i$ with the area A. Thus, as can be seen immediately, in the example of FIG. 2, $|F_1 \cap A| \leq |F_2 \cap A|$ or generally $|F_i \cap A| \leq |F_{i+1} \cap A|$, $\forall 1 \leq i < n$. In case $|F_i \cap A|=0$ then $L_i=\{\}$ and it does not matter in which step of the sequence this result is assigned or determined. Thus, in a preferred example, the sequence of determining the subtrahend surfaces $S_i$ and hence the sets of locations $L_i$ preferably starts with the index representing the beam source having the field of view $F_i$ with the smallest overlap with the area A and the indices are preferably sorted such that the $|F_i \cap A|=|IS_i|$ increases with i. Only to avoid any misunderstandings, it is repeated that of course if $|IS_i|=0$ then it does not matter at which point in the method $L_i:=\{\}$ is executed, it may be at the beginning, at the end or at any other point in time.

It will be appreciated to those skilled in the art having the benefit of this disclosure that this invention is believed to provide a method for manufacturing a workpiece, a storage medium including a program and an additive manufacturing apparatus. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 additive manufacturing apparatus
2 double headed arrow indicating movement of support 82
3 inert gas flow
5 process chamber
6 workpiece (partially manufactured)
7 side walls of process chamber 5
8 bottom of process chamber 5
81 opening in bottom 8
82 movable supported support
9 ceiling of process chamber 5
10 programmable electronic circuitry/controller
12 fusible material
14 top surface of fusible material
$20_i$ $i^{th}$-beam source/projection of $i^{th}$-beam source
$22_i$ $i^{th}$-beam spot of $i^{th}$-beam source $20_1$
$F_i$ fields of view of the $i^{th}$-beam source $L_i$ set of locations $\{\vec{l}_i\}$ to be fused by the $i^{th}$-beam source $20_1$ $\vec{d}_h$ horizontal component of inter gas flow in process chamber 5

$\vec{d}_o$ vector at least essentially perpendicular $\vec{d}_h$ $\vec{b}_{1,j,e}$ vector $\vec{b}_{1,j,l}$ vector $\vec{b}_{1,j,k}$ vector $\vec{b}_{2,j,e}$ vector $\vec{b}_{2,j,l}$ vector $\vec{b}_{2,j,k}$ vector $B_{i,j}$ meandering lines (i,j≤n, i≠j)

The invention claimed is:

1. A method for manufacturing a workpiece, the method comprising:

fusing an area (A) of a layer of a fusible material by irradiating the surface of the area (A) of the layer using a number n, n ≥2 of at least two beam sources to project a corresponding number of n beam spots on n sets of locations ($L_i$) of said surface area (A) of the layer, wherein each beam source has a predefined fuse rate ($R_i$) and a field of view ($F_i$), $$|L_i \cap L_j| \leq \frac{1}{4}\text{Max}(|L_i|, |L_j|), \forall i \neq j$$

and an index i the predefined fuse rate, and the field of view corresponds to a respective $i^{th}$ beam source, 0<i ≥n, an index j, the predefined fuse rate, and the field of view corresponds to a respective $j^{th}$ beam source, 0<j≤n, and a set of all beam source indicating indices is I={1, . . . , n};

wherein the method further comprises at least the following steps:

1.1. estimating an optimum fusing time $t_o(i)$ and/or a size of an optimum fusing area $|L_i^{opt}|$, for the area (A) at least for a first beam source represented by a first index i=1, 1.2. determining intersecting sets ($IS_i$) of the surface area (A) and fields of view ($F_i$) for at least the first index i=1 by assigning $IS_i:=A \cap F_i$ at least for i=1;

1.3. comparing a size of the intersecting sets ($|IS_i|$) to a product of the optimum fusing time $t_o(i)$ with the predefined fuse rate $R_i$ of the corresponding $i^{th}$-beam source and/or to an optimum size of the fusing area $|L_i^{opt}|$ and, in response to at least one of relations $t_0(i)\cdot R_i<|IS_i|$ and $|L_i^{opt}|<|IS_i|$ holding true, performing the following steps:

1.3.1. determining a subtrahend surface $S_i$ with $S_i \subset IS_i$ and at least one of $(1-\alpha_i)(|IS_i|-t_o(i)\cdot R_i) \leq |S_i| \leq (1+\alpha_i)(|IS_i|-t_o(i)\cdot R_i)$, and $(1-\alpha_i)(|IS_i|-|L_i^{opt}|) \leq |S_i| \leq (1+\alpha_i)(|IS_i|-|L_i^{opt}|)$, wherein $\alpha_i \in \{0.25, 0.2, 0.15, 0.1, 0.05, 0.025, 0.01, 0.005, 0\}$ under the condition that for each $\vec{p}_i \in S_i$, $\exists F_k | \vec{p}_i \in F_k$, wherein k is an index such that k >i, $\vec{p}_i$ is a point of the subtrahend surface $S_i$ and 1.3.2. assigning $L_i:=IS_i-S_i$, and 1.4. in response to step 1.3.2 having been carried out, fusing the fusible material at the locations of $L_i$ using the $i^{th}$-beam source after step 1.3.2.

2. The method of claim 1, wherein, in response to at least one of the relations in step 1.3 not holding true, the method further comprises at least the steps of:

2.1. determining a subtrahend surface $S_i$ with $S_i \subset IS_i$ under a condition that for each $\vec{p}_i \in S_i$, $\exists F_k | \vec{p}_i \in F_k$, k>i, and 2.2. assigning $L_i:=IS_i-S_i$.

3. The method of claim 2, further comprising: calculating a corrected minimum mean time $$t'_o = t_o(i+1) = t_o(i) + \frac{(t_o(i) - \langle t_i \rangle) \cdot R_i}{\sum_{j=i+1}^{j \leq n} R_j}$$

and/or a corrected optimum size of the fusing area $|L^{opt'}|=|L_{i+1}^{opt'}|=t_o(i+1)R_{i+1}$, and subsequently replacing for the subsequent execution of the steps 1.2 and 1.3 $t_o(i)$ by $t'_o$ and/or $|L_i^{opt}|$ by $|L^{opt'}|$, wherein $\langle t_i \rangle$ is defined as $$\langle t_i \rangle = \frac{|L_i|}{R_i}.$$

4. The method of claim 1, wherein the method further comprises:

3.1. setting $L_i:=\{\ \}$ if and only if $IS_i=\{\ \}$, and/or 3.2. repeating at least one of:
   step 1.1;
   step 1.2;
   step 1.3;
   determining a subtrahend surface $S_i$ with $S_i \in IS_i$ under a condition that for each $\vec{p}_i \in S_i$, $\exists F_k | \vec{p}_i \in F_k$, k>i; and
   assigning $L_i:=IS_i-S_i$ for all remaining indices $i \in I$ only in response to $IS_i \neq \{\ \}$.

5. The method of claim 1, wherein the step 1.3.1 further comprises:

4.1. defining at least a first meandering line $B_{i,j}$ parallel to a first direction $\vec{b}_1$, wherein the first meandering line defines a boundary between adjacent sets of locations $L_i$ and $L_j$;

4.2. using the first meandering line $B_{i,j}$ to determine a first boundary of the subtrahend surface $S_i$;

4.3. shifting the first meandering line in a second direction $\vec{b}_2$ that reduces $\Delta S_i$, wherein $\Delta S_i=|t_o(i)\cdot R_i-|IS_i-S_i||$.

6. The method of claim 5, wherein the first direction and the second direction are linearly independent from each other.

7. The method of claim 5, wherein the first meandering line $B_{j,i}$ has meandering being parallel to the first direction $\vec{b}_1$.

8. The method of claim 5, wherein said fusing an area of a layer of a fusible material at the set of locations $L_j$ comprises pivoting the $i^{th}$-beam source while the $i^{th}$-beam source projects an $i^{th}$-beam spot to thereby move the $i^{th}$-beam spot along lines being multiples of a fusing vector $\vec{v}_i$, wherein at least one of meandering lines $B_{i,j}$, $B_{i,k}$ consists of concatenated sections that are alternatingly orthogonal and parallel to the fusing vector $\vec{v}_i$.

9. The method of claim 5, further comprising: establishing an inert gas flow in a flow direction $\vec{d}$ over a top of a powder bed, wherein $\vec{d}_h$ denotes a component of the flow direction that is parallel to the layer of the fusible material, and wherein a condition 13.1 is satisfied in that 13.1. a distance measured parallel to $\vec{d}_h$ between an end point $\vec{b}_{i,j,e}$ of $B_{i,j}$ and any other point $\vec{b}_{i,j,l}$ and $\vec{b}_{i,j,m}$ of $B_{i,j}$ is unique in that $|\vec{d}_h \cdot (\vec{b}_{i,j,l} - \vec{b}_{i,j,e})| \neq |\vec{d}_h \cdot (\vec{b}_{i,j,m} - \vec{b}_{i,j,e})| \forall \vec{b}_{i,j,l}, \vec{b}_{i,j,m} \in B_{i,j}, \vec{b}_{i,j,l} \neq \vec{b}_{i,j,m}$, or wherein a condition 13.2 is satisfied in that 13.2. a distance measured orthogonally to $d_h$ between an end point $\vec{b}_{i,j,e}$ of the first meandering line $B_{i,j}$ and any other points $\vec{b}_{i,j,l}$ and $\vec{b}_{i,j,m}$ of $B_{i,j}$ are unique in that $|\vec{d}_o \cdot (\vec{b}_{i,j,l} - \vec{b}_{i,j,e})| \neq |\vec{d}_o \cdot (\vec{b}_{i,j,m} - \vec{b}_{i,j,e})| \forall \vec{b}_{i,j,l}, \vec{b}_{i,j,m} \in B_{i,j}, \vec{b}_{i,j,l} \neq \vec{b}_{i,j,m}$ wherein $\vec{d}_o \perp \vec{d}_h$.

10. The method of claim 9, wherein there are at least two different sections $SQ_{i,j}$ and $SQ_{q,r}$, which are respectively sections of two meandering lines $B_{i,j}$, $B_{q,r}$, that are boundaries between adjacent sets of locations $L_i$, $L_j$ and $L_q$, $L_r$, respectively, wherein an end point of the section $SQ_{i,j}$ is also an end point of the section $SQ_{q,r}$, and wherein either the condition 13.1 or the condition 13.2 applies to both $B_{i,j}$ and $B_{q,r}$.

11. The method of claim 10, wherein the condition 13.1 applies to both $B_{i,j}$ and $B_{q,r}$, and wherein each of $L_i$, $L_j$, $L_q$ and $L_r$ is separated into m portions $L_{s,1}$, $L_{s,2}$, ..., $L_{s,m}$, (m ≥2) by lines extending essentially parallel to a component $\vec{d}_h$ of a flow direction $\vec{d}$ of an inert gas flow and wherein $|L_{s,l}| = |L_{s,n}| \pm 0.15 \cdot |L_{s,n}| \forall s \in \{i, j, q, r\}$, l, n≤m, l≠n, wherein portions with the same second index are aligned parallel to the component $\vec{d}_h$ of the flow direction $\vec{d}$ of the inert gas flow and wherein only portions with the same second index are irradiated simultaneously.

12. The method of claim 1, further comprising: prior to determining the subtrahend surface $S_i$, assigning a portion $C_i$ of the area A to a dedicated $i^{th}$-beam source, wherein the condition $C_i \subset F_i$ is observed, and wherein in step 1.3.1 the condition $S_i \cap C_i = \{\ \}$ is observed.

13. The method of claim 1, wherein prior to step 1.2 indices of the fields of view $F_i$ are sorted to obey the condition $\mathrm{Min}(\Sigma_j^{i \neq j} F_j \cap F_j) \leq \mathrm{Min}(\Sigma_j^{i+1 \neq j} F_{i+1} \cap F_j) \forall i > n$ and wherein steps 1.2 and 1.3 are repeated while increasing a value of an index with each repetition by one, except for those indices i for which $F_i \cap A = \{\ \}$.

14. The method of claim 1, wherein prior to step 1.2 indices of the fields of view $F_i$ are sorted to obey the condition $|IS_i| \leq |IS_j| \forall i < j$, wherein intersecting sets $(IS_j)$ are functions of at least the surface area (A) and fields of view $(F_j)$ and wherein steps 1.2 and 1.3 are repeated while increasing a value of an index with each repetition by one, except for those indices i for which $IS_i = \{\ \}$.

15. The method of claim 14, wherein there are at least two different sections $SQ_{i,j}$ and $SQ_{q,r}$, which are respectively sections of two meandering lines $B_{i,j}$, $B_{q,r}$, that are boundaries between adjacent sets of locations $L_i$, $L_j$ and $L_q$, $L_r$, respectively, wherein an end point of the section $SQ_{i,j}$ is also an end point of the section $SQ_{q,r}$.

16. The method of claim 1, further comprising repeating step 1.2, wherein the intersecting sets $IS_j$ for at least one j ≥2 are determined as $IS_j := (A - \Sigma_{i=1}^{i<j} L_j)(A - \Sigma_{i=1}^{i<j} L_i) \cap F_j$, wherein intersecting sets $(IS_j)$ are functions of at least the surface area (A) and fields of view $(F_i)$.

17. The method of claim 1, further comprising establishing an inert gas flow in a flow direction $\vec{d}$ over a top of a powder bed, the flow direction $\vec{d}$ having a component $\vec{d}_h$ that is parallel to the layer of the fusible material.

18. The method of claim 17, wherein a fusing vector $\vec{v}_i$ has a component that is opposite to the flow direction $\vec{d}$ of the inert gas flow.

19. The method of claim 1, wherein the optimum fusing time $t_o(i)$ is determined using a relation $$\frac{(1 - \beta_{t,i})|A|}{\sum_{j=1}^{n} R_j} \leq t_o(i) \leq \frac{(1 + \beta_{t,i})|A|}{\sum_{j=1}^{n} R_j}$$

and/or a relation $$(1 - \beta_{t,i})\left(t_o(i-1) + \frac{t_{o(i-1)} \cdot R_{i-1} - |L_{i-1}|}{\sum_{j=i}^{n} R_j}\right) \leq$$

$$t_o(i) \leq (1 + \beta_{t,i})\left(t_o(i-1) + \frac{t_{o(i-1)} \cdot R_{i-1} - |L_{i-1}|}{\sum_{j=i}^{n} R_j}\right),$$

wherein $|A|$ is the size of the area A, $\beta_{t,i} \in \{25/100, 20/100, 15/100, 10/100, 5/100, 25/1000, 1/100, 5/1000, 25/10000, 125/10000, 1/1000, 0\}$, $t_o(0)=0$, and $L_0=0$.

20. A non-transitory tangible storage medium comprising a program code that, when executed, instructs a programmable electronic circuitry of an additive manufacturing apparatus to execute the method of claim 1.

21. An additive manufacturing apparatus comprising a support, multiple beam-sources for fusing a fusible material, and a controller configured to control operation of the multiple beam sources, wherein the manufacturing apparatus further comprises the storage medium of claim 20.

* * * * *